(12) United States Patent
Takada

(10) Patent No.: US 8,797,559 B2
(45) Date of Patent: Aug. 5, 2014

(54) INFORMATION PROCESSING DEVICE, INFORMATION PROCESSING METHOD, AND PROGRAM THEREOF

(75) Inventor: Katsuyuki Takada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 293 days.

(21) Appl. No.: 13/229,607

(22) Filed: Sep. 9, 2011

(65) Prior Publication Data

US 2012/0062926 A1 Mar. 15, 2012

(30) Foreign Application Priority Data

Sep. 13, 2010 (JP) ................................ 2010-204851

(51) Int. Cl.
*G06F 3/12* (2006.01)
*G06K 1/00* (2006.01)
*G06K 15/00* (2006.01)

(52) U.S. Cl.
USPC .......................... 358/1.13; 358/1.9; 358/1.17

(58) Field of Classification Search
None
See application file for complete search history.

(56) References Cited

U.S. PATENT DOCUMENTS

| 7,240,281 B2 | 7/2007 | Gomi et al. | |
| 2004/0128280 A1* | 7/2004 | Gomi et al. | 707/1 |
| 2008/0235564 A1* | 9/2008 | Erol et al. | 715/202 |

FOREIGN PATENT DOCUMENTS

| JP | 3776866 B2 | 5/2006 |
| JP | 2008-305278 A | 12/2008 |

OTHER PUBLICATIONS

Yasuko Takahashi, "How to Make a Blog for Newbies First Edition", Shuwa System Co., Ltd. (Kazukuni Saito), Feb. 1, 2010, First Edition, pp. 170.

* cited by examiner

*Primary Examiner* — Thierry L Pham
(74) *Attorney, Agent, or Firm* — Kilpatrick Townsend & Stockton LLP

(57) ABSTRACT

An information processing device is provided where document data, which is written in a blog format which includes a plurality of logs using HTML, is acquired via the Internet and an extraction condition such as specification of the category information or specification of the title information is input based on an operation by the user. Then, the acquired document data is analyzed, a log which matches the input extraction condition is extracted out of the plurality of logs included in the document data, and log printing data is created for printing the log by embedding the extracted log into the log printing template written using HTML. That is, when the extraction condition is input for extracting a log which the user desires to print out, log printing data of the log which matches the extraction condition, that is, a log which a user desires to print out, is created.

9 Claims, 16 Drawing Sheets

FIG. 4

| TEMPLATE CLASSIFICATION NUMBER | SITE DETERMINATION CONDITION |
|---|---|
| A1 | Object aaa IN JavaScript |
| A2 | "ccc" IN VARIABLE bbb IN JavaScript |
| A3 | "ddd.eee.co.jp" IN URL |
| ⋮ | ⋮ |
| An | TAG <base href="http://fff.ggg.ne.jp> IN DOCUMENT FILE |

```
<?xml version="1.0" encoding="Shift_JIS"?>
<!DOCTYPE html PUBLIC "-//W3C//DTD XHTML 1.0 Transitional//EN" "http://www.w3.org/TR/xhtml1/DTD/xhtml1-transitional.dtd">
<html xmlns="http://www.w3.org/1999/xhtml" xml:lang="ja" lang="ja">
<head>
<meta http-equiv="Content-Type" content="text/html; charset=Shift_JIS" />
<title> OIRASE AKITA: TRAVELLING UNDER THE SKY </title>
<meta name="description" content= "A RECORD OF TRAVELLING SCENES IN OIRASE, AKITA" />
<meta name="keywords" content= "TRAVELLING UNDER THE SKY" />
<meta http-equiv="Content-Style-Type" content="text/css" />
<meta http-equiv="Content-Script-Type" content="text/javascript" />
<link rel="stylesheet" href="http://tabinosoranoshita.seesaa.net/styles-index.css" type="text/css" />
<link rel="stylesheet" href="http://blog.seesaa.jp/css/user-common.css" type="text/css" />
<link rel="alternate" href="http://tabinosoranoshita.seesaa.net/index.rdf" type="application/rss+xml" title="RSS" />
</head>
.... (ABBREVIATED) ....
<div class="blog">
.... (ABBREVIATED) ....
<h2 class="date"> [AUGUST 23, 2007] </h2> ............62 (TIME AND DATE INFORMATION)
<div class="blogbody">
<h3 class="title"><a href="http://tabinosoranoshita.seesaa.net/article/159936708.html" class="title">
[OIRASE AKITA] </a></h3> ..............61 (BODY OF LOG)
<div class="text"/> EVENING AT END OF SUMMER <br /><br />OIRASE FLOWS TOWARD TOWADA LAKE <br /><br />
<a href="http://sora-shita.up.seesaa.net/image/P1150392.JPG" target="_blank"><img src="http://sora-
shita.up.seesaa.net/image/P1150392-thumbnail2.JPG" width="320" height="213" border="0" align=""
alt="P1150392.JPG" onclick="location.href = 'http://tabinosoranoshita.seesaa.net/upload/detail/image/
P1150392-thumbnail2.JPG.html'; return false;" style="cursor:pointer;" /></a>
.... (ABBREVIATED) ....
```

60 (LOG)

63 (TITLE INFORMATION)

FROM FIG. 5A

```
<br /><br /> LINGERING FOR A WHILE UNDER A MEMORABLE SKY WHICH SEEMS TO TELL OF THE END OF THE SUMMER IN TOHOKU <a
name="more"></a><div id="article-ad" style="margin-top:20px; text-align:center;clear:both;">
<script type="text/javascript"><!--
    seesaa_template_id = '4002';
    seesaa_hostsite_id = '1';
    seesaa_site_id     = 'tabinosoranoshita';
    seesaa_genre_id    = '37';
    seesaa_article_id  = '159936708';
    seesaa_keyword_char = 'utf8';
    seesaa_keyword_list = '';
    seesaa_adcount     = '3';
//--></script>
<script type="text/javascript" src="http://match.seesaa.jp/~fjs/square_under_seesaa.js"></script>
</div>

···· (ABBREVIATED) ····

</div>
<div class="posted">posted by TANUKI AOI at 00:00| <a href="http://    65 (NUMBER OF COMMENTS)
tabinosoranoshita.seesaa.net/article/159936708.html#comment">[Comment(2)] </a>
| <a href="http://tabinosoranoshita.seesaa.net/category/8630034-1.html">[DIARY] </a>
                                                64 (CATEGORY INFORMATION)
···· (ABBREVIATED) ····

</div>
</div>
</div>
```

FIG. 6

```
<div id="comments">
<a name="comment"></a>
<div class="comments-head"> COMMENTS ON THIS ITEM</div>

<div class="comments-body">
<div class="text"> THAT IS BEAUTIFUL SCENERY. NOW, I WOULD LIKE TO GO TOO. (^o^)」</div>
<div class="comments-post"> Posted by SUKI at AUGUST 26, 2010 17:45   <br /></div>
</div>                                                                          ···· 66 (COMMENT)

<div class="comments-body">
<div class="text"> THE SUNSET IS BEAUTIFUL. WHERE ARE YOU GOING TO GO NEXT?<br /><br /> DID YOU HAVE NICE FOOD?<br /> IF YOU HAVE A CHANCE, PLEASE GET IN TOUCH.</div>
<div class="comments-post"> Posted by ITO at AUGUST 26, 2010 18:11   <br /></div>
</div>                                                                          ···· 67 (COMMENT)

···· (ABBREVIATED) ····
</form>
</div>
···· (ABBREVIATED) ····
```

FIG. 7

| TEMPLATE CLASSIFICATION NUMBER | TYPE OF INFORMATION | | ANALYSIS DEFINITION INFORMATION |
|---|---|---|---|
| A1 | LOG | | IN TAG <div class="blog"> |
| | | BODY OF LOG | IN TAG <div class="blogbody"> in Tag <div class="blog"> |
| | | ADDITIONAL INFORMATION | • TIME AND DATE INFORMATION<br>  IN TAG <h2 class="date"> IN TAG <div class="blog"><br>• TITLE INFORMATION<br>  IN TAG <h3 class="title"> IN TAG <div class="blogbody"><br>• CATEGORY INFORMATION<br>  INCLUDED IN CHARACTER ROW "category"<br>  IN TAG <div class="posted"><br>• NUMBER OF COMMENTS<br>  INCLUDED IN CHARACTER ROW "#comment"<br>  IN TAG <div class="posted"> |
| | COMMENT | | IN TAG <div class="comments-body"> IN TAG <div id="comments"> |

| LOG NUMBER | TIME AND DATE INFORMATION | TITLE INFORMATION | CATEGORY INFORMATION | NUMBER OF COMMENTS | URL |
|---|---|---|---|---|---|
| B1 | OCTOBER 23, 2007 | OIRASE, AKITA | DIARY | 2 | http://www.****.jp/ |
| B2 | ○MONTH ○DAY, ○YEAR | ○○ | TRAVEL | 3 | http://www.・・・・.jp/ |
| ... | ... | ... | ... | ... | ... |
| Bm | ×MONTH ×DAY, ×YEAR | × | DAY OUT WITH CHILDREN | 7 | http://www.++++.jp/ |

32a

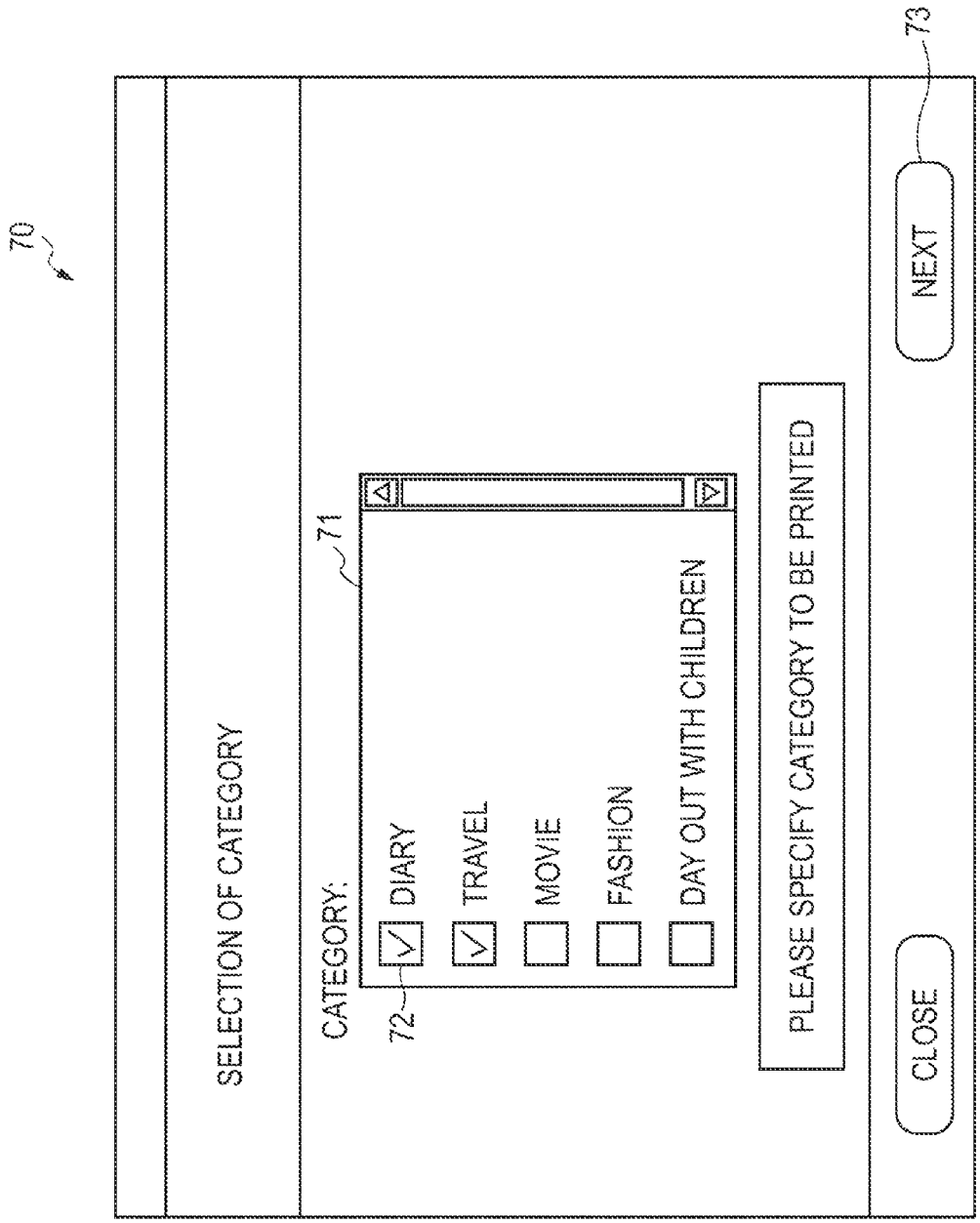

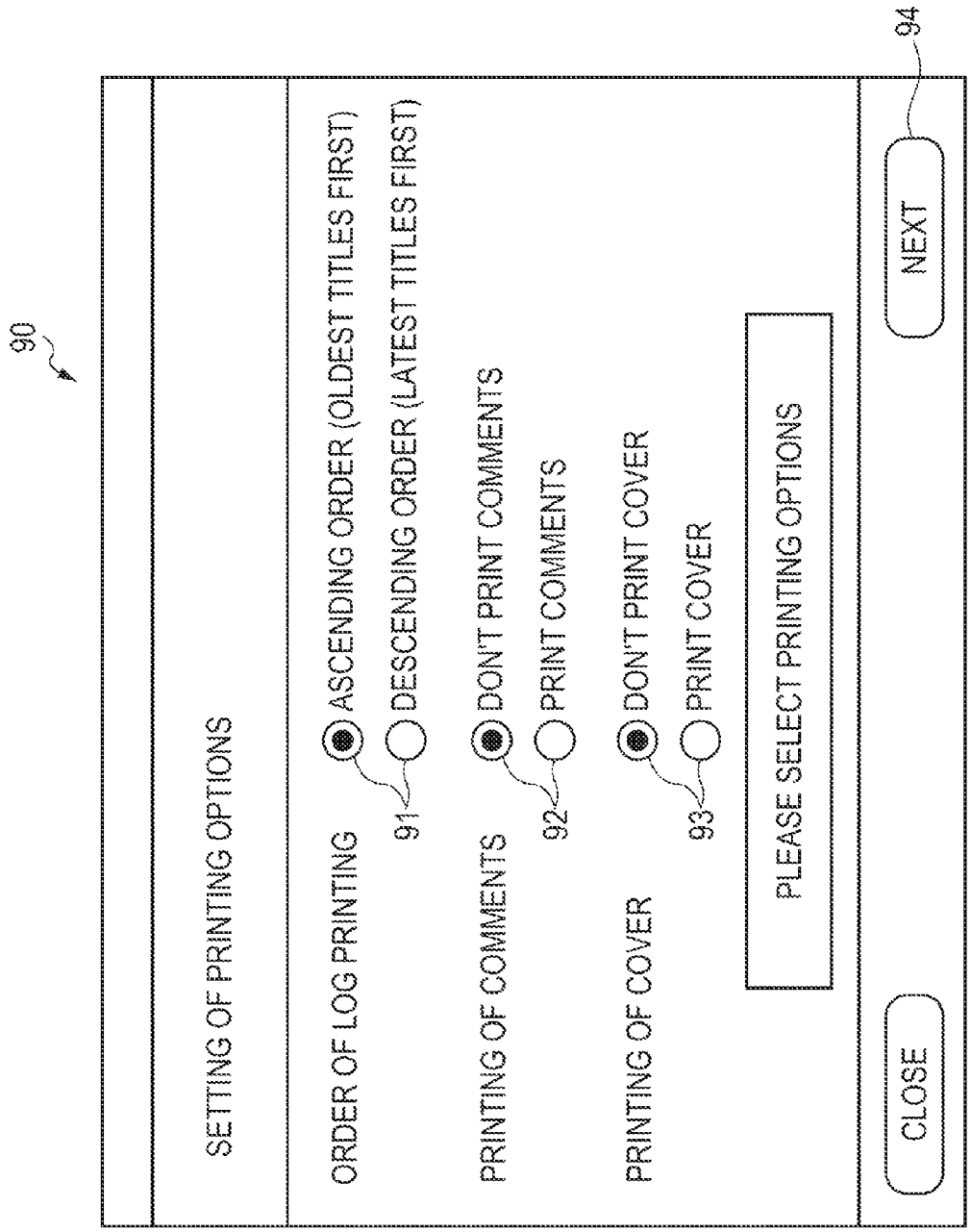

FIG. 12

```
<html>
    <head>
    </head>
    <body id="mainIndex">
 <!--div id='frame'-->
     <div id='main'>
     <div id='sub_main'>
     <div class='entry'>
     <div id='ewpsbw_content_body'></div>    ~68
     </div>
    </div>
   </div>
  <!--/div-->
 </div>
</html>
```

EMBEDDED LOG

```
<head>
</head>
<body id="mainIndex">
<!--<div id='frame'-->
    <div id="sub_main">
    <div class="entry">
<div class="blog">
 ....(ABBREVIATED).....
<h2 class="date"> AUGUST 23, 2007 </h2>
<div class="blogbody">
<h3 class="title"><a href="http://tabinosoranoshita.seesaa.net/article/159936708.html" class="title">
OIRASE AKITA </a> </h3>
<div class="text"> EVENING AT END OF SUMMER <br /><br /> OIRASE FLOWS TOWARD TOWADA LAKE <br /><br /><a
href="http://sora-shita.up.seesaa.net/image/P1150392.JPG" target="_blank"><img src="http://sora-
shita.up.seesaa.net/image/P1150392-thumbnail2.JPG" width="320" height="213" border="0" align=""
alt="P1150392.JPG" onclick="location.href = 'http://tabinosoranoshita.seesaa.net/upload/detail/image/P1150392-
thumbnail2.JPG.html'; return false;" style="cursor:pointer;" /></a>
 ....(ABBREVIATED).....
<br /><br /> LINGERING FOR A WHILE UNDER A MEMORABLE SKY WHICH SEEMS TO TELL OF THE END OF THE SUMMER IN TOHOKU <a
name="more"></a><div id="article-ad" style="margin-top:20px; text-align:center;clear:both;">
<script type="text/javascript"><!--
seesaa_template_id  = '4002';
seesaa_hostsite_id  = '1';
seesaa_site_id      = 'tabinosoranoshita';
seesaa_genre_id     = '37';
seesaa_article_id   = '159936708';
seesaa_keyword_char = 'utf8';
seesaa_keyword_list = '';
seesaa_adcount      = '3';
//--></script>
<script type="text/javascript" src="http://match.seesaa.jp/~/js/square_under_seesaa.js"></script>
</div>
 ....(ABBREVIATED).....
```

FROM FIG. 13A

```
</div>
<div class="posted">posted by TANUKI AOI at 00:00| <a href="http://tabinosoranoshita.seesaa.net/article/159936708.html#comment"> Comment(2) </a>
| <a href="http://tabinosoranoshita.seesaa.net/category/8630034-1.html"> DIARY </a>
....(ABBREVIATED)....
</div>
</div>
</div>
    </div>
    </div>
    </div>
    <!----/div---->
  </div>
</html>
```

INFORMATION PROCESSING DEVICE, INFORMATION PROCESSING METHOD, AND PROGRAM THEREOF

This application claims priority to Japanese Patent Application No. 2010-204851, filed Sep. 13, 2010, the entirety of which is incorporated by reference herein.

BACKGROUND

1. Technical Field

The present invention relates to an information processing device, an information processing method, and a program thereof.

2. Related Art

In the past, as an information processing device, with regard to a downloaded electronic document such as online help or an online manual, a device (for example, Japanese Patent No. 3776866) is known where the HTML file description which configures the electronic document is analyzed and a processed file is created which has been partitioned into item units of the document structure of the electronic document. By printing out the document file based on the processed file, it is possible to process the electronic document in a printed form in the format of the original book.

However, recently, weblogs (referred to hereinafter as blogs) are widely used to create and publish logs (records) in the format of diaries via the Internet. Then, there is demand for printing out a log desired by a user from a plurality of logs created as a blog. However, a blog has a large number of logs and the content covers a broad range, and since a log which a user desires to print out is searched for and printed out, there are cases where a complicated operation is necessary. For example, in a case where the number of logs is large and all of the logs are not able to be displayed when the web page of a blog is displayed on a screen using a browser, an operation is necessary where an item which is desired by a user is searched for based on a link on a web page and is displayed on a screen using the browser, and after that, printing is instructed. In addition, when a plurality of logs are displayed on a screen using a browser and when there is a desire to print out only a portion of the logs, an operation is necessary where printing is instructed after only the desired log is displayed on the screen. Furthermore, when the user wants to print out a plurality of logs, it is necessary that an operation, where printing is performed after the log which is desired to be printed is searched for and displayed on the screen using the browser, be repeated a plurality of times.

SUMMARY

An advantage of some aspects of the invention is that log printing data is created for printing out a log desired by a user from a plurality of logs without a complicated operation.

The invention adopts the configuration below in order to achieve the advantages described above.

An information process device according to an aspect of the invention is provided with a document data acquisition unit which acquires document data written in a blog format which includes a plurality of logs using a markup language via a computer network, a template storing unit which stores a log printing template which is written in the markup language, an extraction condition input unit which inputs a predetermined extraction condition based on an operation by a user, a log extraction unit which analyses the acquired document data and extracts a log which matches the input extraction condition out of a plurality of logs included in the document data, and a printing data creating unit which creates log printing data for printing the log by embedding the extracted log into the log printing template.

In the information process device according to the aspect of the invention, document data, which is written in a blog format which includes a plurality of logs using a markup language, is acquired via a computer network and a predetermined extraction condition is input based on an operation by a user. Then, the acquired document data is analyzed, a log which matches the input extraction condition is extracted out of a plurality of logs included in the document data, and log printing data is created for printing the log by embedding the extracted log into the log printing template written in the markup language. That is, when an extraction condition is input for extracting a log which a user desires to print out, log printing data of a log which matches the extraction condition, that is, a log which a user desires to print out, is created. Due to this, it is possible to create log printing data for printing out the log desired by the user from a plurality of logs without a complicated operation. Here, the document data which is a blog format is not limited to, for example, document data in a site created using a tool for creating blogs prepared in advance (narrow definition of blog) but has the meaning of including a wide range of document data created in a format where logs created with regard to a topic such as a diary or reviews are continually added.

In the information process device according to the aspect of the invention, it is desirable that each log in the plurality of logs has additional information, the extraction condition input unit is a unit which inputs a condition associated with at least specification of the additional information as the extraction condition, and the additional information include at least any out of time and date information which expresses the data and time of the log, title information which expresses the title of the log, or category information which expresses the category which the log belongs to. In this manner, by the user specifying the additional information, printing data for printing the log, which has the additional information specified by the user, is able to be acquired.

In the information process device according to the aspect of the invention where each log has the additional information as described above, it is desirable that an additional information acquisition unit, which analyses the acquired document data and acquires the additional information of the plurality of logs included in the document data, and an additional information output unit, where of the acquired additional information is output to the user as a list, are provided, and the extraction condition input unit is a unit which inputs specification of at least one of the items of the output additional information based on an operation by the user. In this manner, since the additional information in the log is output to the user in advance, it is easy for the user to input the extraction condition.

In the information process device according to the aspect of the invention which is provided with the additional information acquisition unit and the additional information output unit as described above, it is desirable that the additional information includes at least the category information, the additional information acquisition unit is a unit which acquires the category information as the additional information, the additional information output unit is a unit which arranges and outputs the category information in order of the number of logs which belong to each item of the category information when the acquired category information is listed and output to the user, and the extraction condition input unit is a unit which inputs specification of at least one of the items of the output category information based on an operation by the user as the specification of the additional information.

In the information process device according to the aspect of the invention which is provided with the additional information acquisition unit and the additional information output unit as described above, it is desirable that the plurality of logs have information on the number of comments which expresses the number of comments with regard to each of the logs, the additional information includes at least the title information, the additional information acquisition unit is a unit which analyses the acquired document data and acquires the title information and information on the number of comments which is expressed in the number of comments in the respective logs included in the document data so that the title information and the number of comments correspond, the additional information output unit is a unit which arranges and outputs the title information in order of the number of comments corresponding to the title information when the acquired title information is listed and output to the user, and the extraction condition input unit is a unit which inputs specification of at least one of the items of the output title information based on an operation by the user as the specification of the additional information.

In the information process device according to the aspect of the invention which is provided with the additional information acquisition unit and the additional information output unit as described above, it is desirable that an instruction input unit, where an instruction from the user is input based on an operation by the user, is provided, the additional information includes at least the time and date information, the title information, and the category information, the additional information acquisition unit is a unit which analyses the acquired document data and acquires the time and date information, the title information, and the category information in the respective logs included in the document data so that the time and date information, the title information, and the category information correspond, the additional information output unit is a unit which performs either of outputting of the title information in chronological order expressed by the time and date information for each category expressed by the category information or outputting of the title information in chronological order expressed by the time and date information irrespective of the category information, based on an instruction from the instruction input unit, when outputting the acquired title information arranged in chronological order based on the time and date information which corresponds to the title information, and the extraction condition input unit is a unit which inputs specification of at least one of the items of the output title information based on an operation by the user as the specification of the additional information. In this manner, since it is possible for the user to specify whether or not the list of the title information is arranged for each category, it is possible for the user to easily find a desired log.

In the information process device according to the aspect of the invention described above, it is desirable that the printing data creating unit is a unit which creates the log printing data for printing the log by embedding the extracted log into the log printing template and which creates cover printing data for printing the cover of the log. In this manner, since not only the log printing data of the desired log but also the cover printing data is created, it is possible for the user to easily create a booklet where the desired log is compiled by performing printing based on the log printing data and the cover printing data.

An information processing method according to an aspect of the invention includes acquiring document data written in a blog format which includes a plurality of logs using a markup language via a computer network, inputting a predetermined extraction condition based on an operation by a user, analyzing the acquired document data and extracting a log which matches the input extraction condition out of a plurality of logs included in the document data, and creating log printing data for printing the log by embedding the extracted log into the log printing template written in the markup language.

In the information processing method according to the aspect of the invention, document data, which is written in a blog format which includes a plurality of logs using a markup language, is acquired via a computer network and a predetermined extraction condition is input based on an operation by a user. Then, the acquired document data is analyzed, a log which matches the input extraction condition is extracted out of a plurality of logs included in the document data, and log printing data is created for printing the log by embedding the extracted log into the log printing template written in the markup language. That is, when an extraction condition is input for extracting a log which a user desires to print out, log printing data of a log which matches the extraction condition, that is, a log which a user desires to print out, is created. Due to this, it is possible to create log printing data for printing out the log desired by the user from a plurality of logs without a complicated operation. Here, in the information processing method of the invention, steps which realize any of the functions of the information processing device described above may be added.

The program according to an aspect of the invention is for causing a computer to function as any of the information processing devices of the invention described above. The program may be recorded on a recording medium (for example, a hard disk, a ROM, an FD, a CD, a DVD, or the like) which is able to be read by the computer, may be distributed from a certain computer to another computer via a transmission medium (the Internet or a communication network such as a LAN), or may be transferred in any other format. If the program is executed in the computer, since the computer functions as the information processing device of the invention described above, the same operational effects as the information processing device of the invention are able to be obtained.

BRIEF DESCRIPTION OF THE DRAWINGS

The invention will be described with reference to the accompanying drawings, wherein like numbers reference like elements.

FIG. 4 is an explanatory diagram illustrating an example of a site determination table.

FIGS. 5A and 5B are explanatory diagrams illustrating an example of an earlier portion of document data in a web page.

FIG. 6 is an explanatory diagram illustrating an example of a later portion of document data in a web page.

FIG. 7 is an explanatory diagram illustrating an example of an analysis table.

FIG. 8 is an explanatory diagram illustrating an example of an additional information table.

FIG. 9 is an explanatory diagram illustrating an example of a category selection screen.

FIGS. 10A and 10B are explanatory diagrams illustrating an example of a title selection screen.

FIG. 11 is an explanatory diagram illustrating an example of a printing option setting screen.

FIG. 12 is an explanatory diagram illustrating an example of a log printing template.

FIGS. 13A and 13B are explanatory diagrams illustrating an example of a log printing data.

DESCRIPTION OF EXEMPLARY EMBODIMENTS

Figure 1:
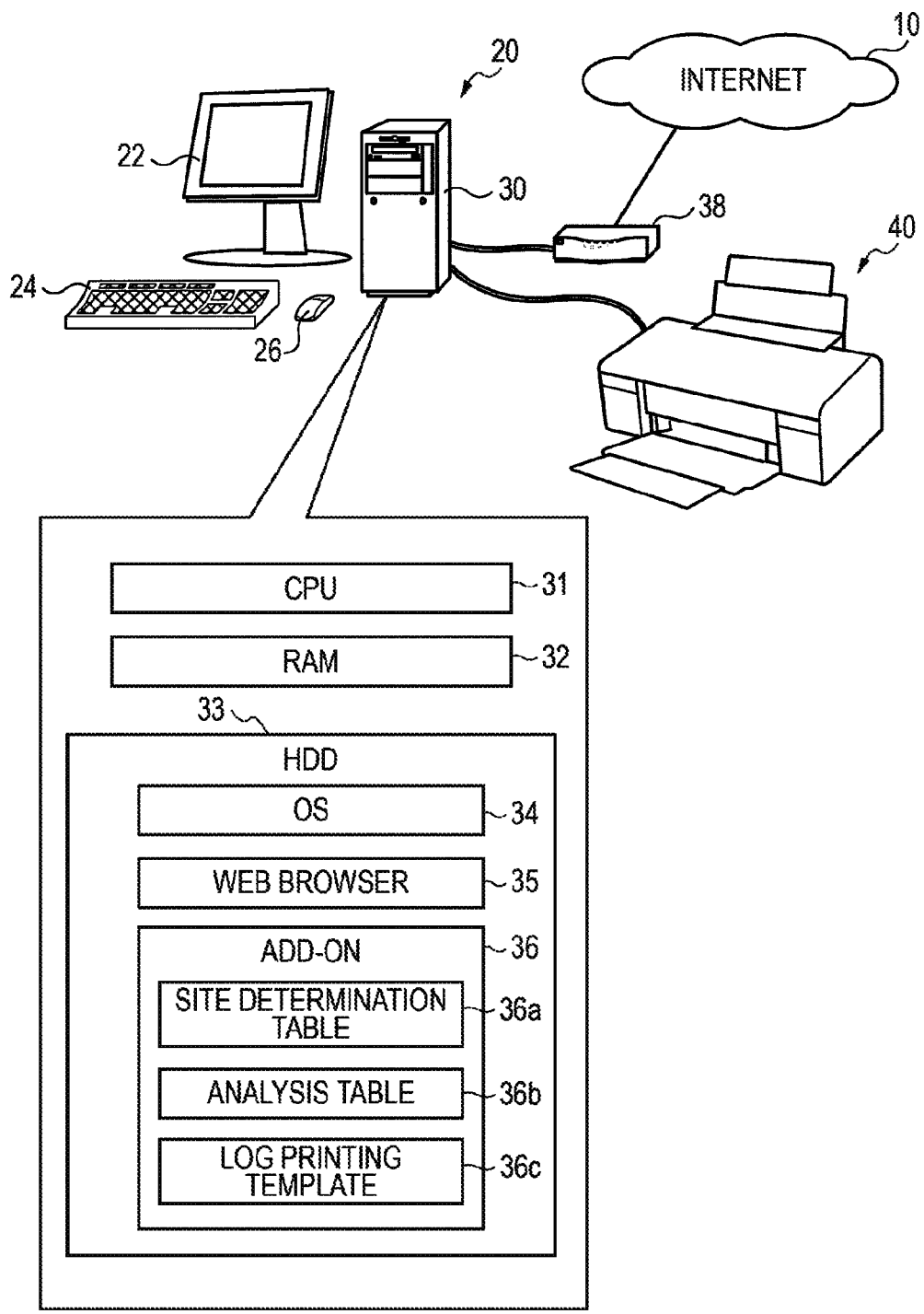
FIG. 1 is a configuration diagram illustrating an outline of an information processing device.

Next, the embodiment of the invention will be described based on the diagrams. FIG. 1 is a configuration diagram illustrating an outline of an information processing device 20 of an embodiment of the invention. The information processing device 20 of the embodiment is configured as a general-use personal computer connected to the Internet 10 via a router 38, and is provided with a computer body 30, a liquid crystal display 22 as a display device, and a keyboard 24 and a mouse 26 as input devices. In addition, the information processing device 20 of the embodiment is connected to a printer 40 and is able to print an image by print data being created and output to the printer 40.

The computer body 30 is provided with a CPU 31 which executes various types of control, a RAM 32 which temporarily stores data, and a hard disk drive device (HDD) 33 which is a large capacity memory which stores various types of processing programs. An operating system (OS) 34, a web browser 35 for browsing a web page on the Internet 10, and an add-on 36 as an extension facility of the web browser 35 are installed in the HDD 33.

The add-on 36 is a program which makes it possible to perform blog printing for printing out a log desired by a user from a web page in a blog format as the extension facility of the web browser 35. The add-on 36 is provided with a site determination table 36a for determining the type of web page in a blog format, an analysis table 36b for analyzing document data which configures a web page, and a log printing template 36c for printing out a log in document data. Here, the details of the site determination table 36a, the analysis table 36b, and the log printing template 36c will be described later.

Figure 2:
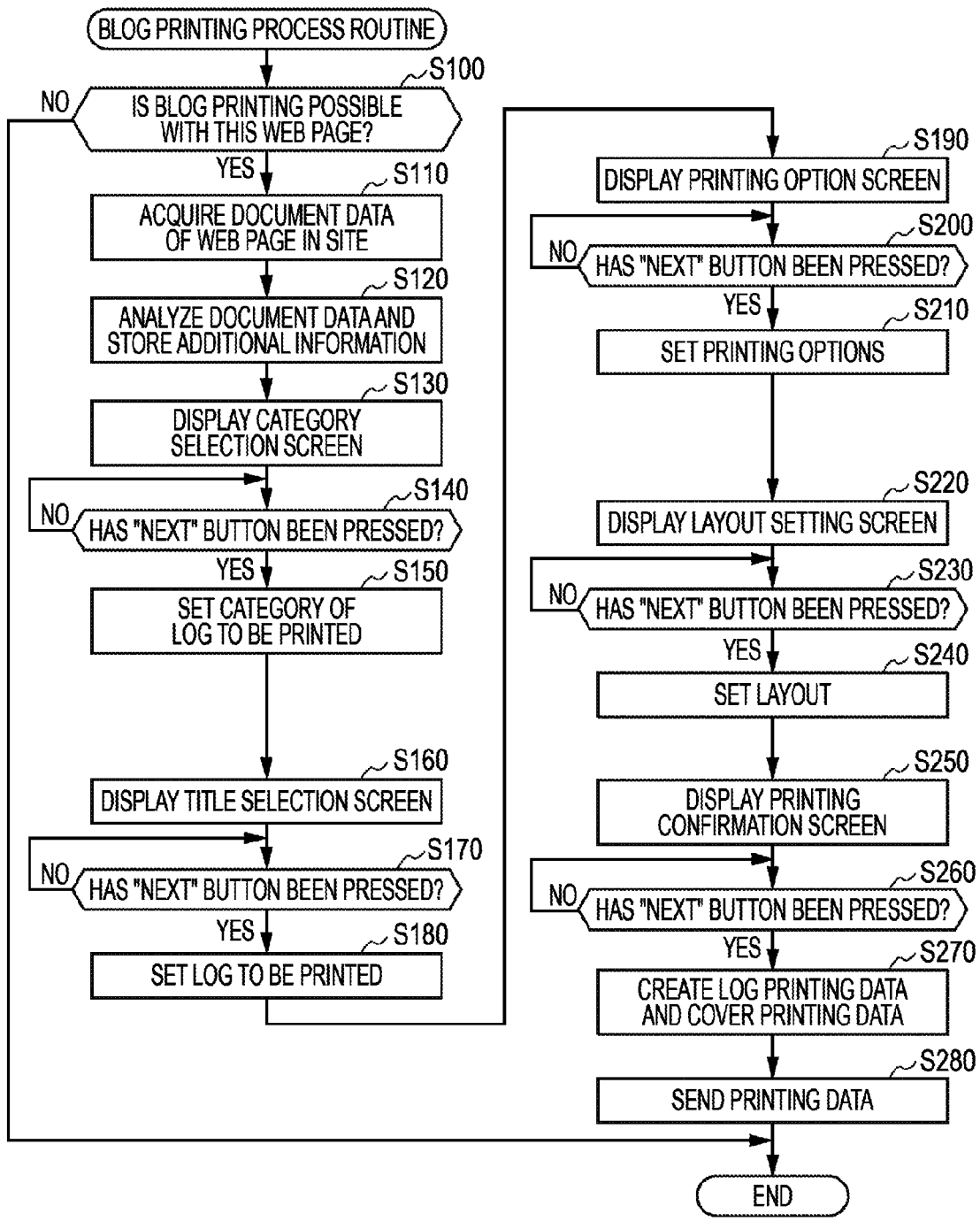
FIG. 2 is a flow chart illustrating an example of a blog printing process routine.
Figure 3:
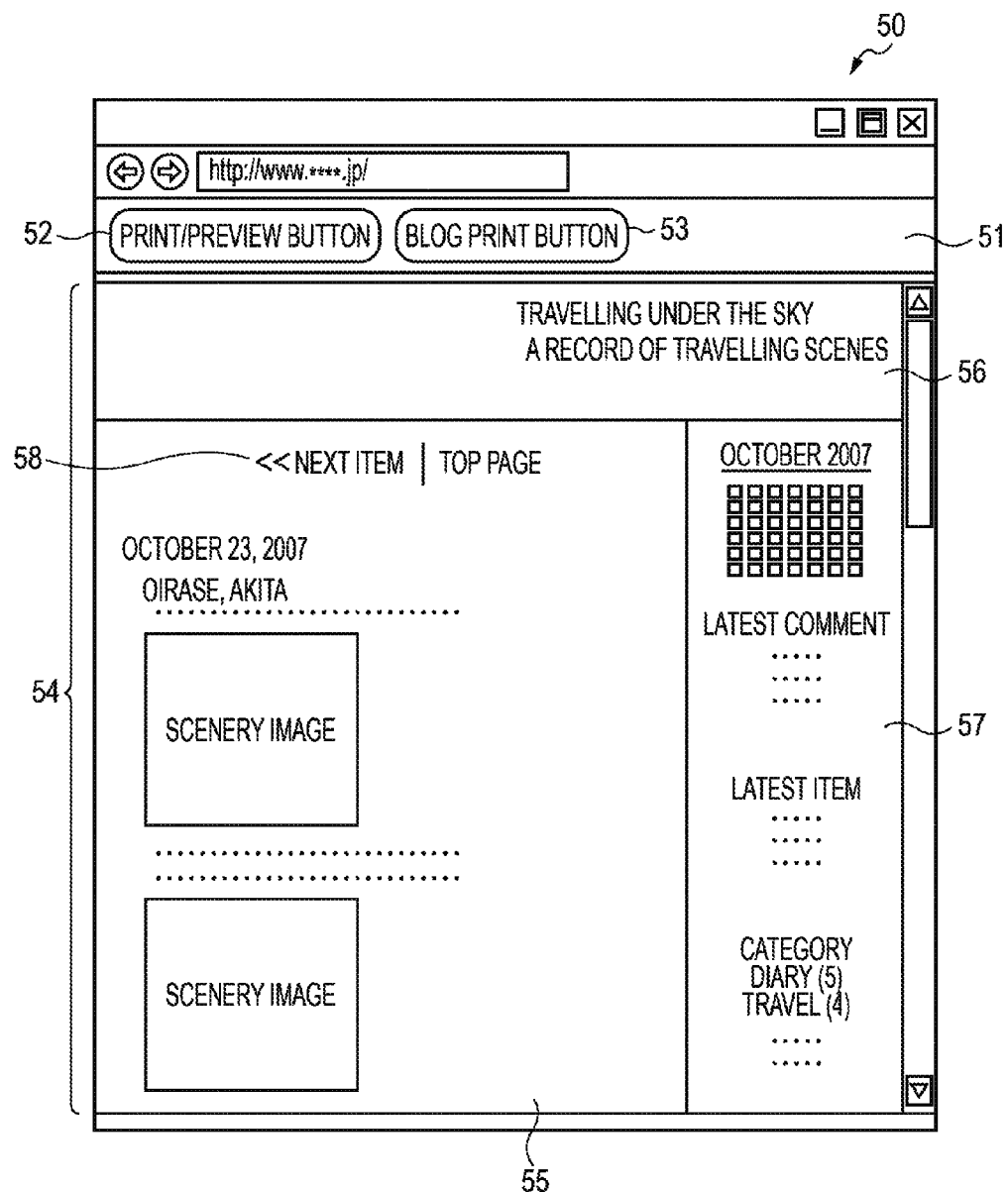
FIG. 3 is an explanatory diagram illustrating an example of a browser screen.

Next, operation of the information processing device 20 of the embodiment configured in this manner, in particular, an operation of performing blog printing which is printing of a log desired by a user from a web page in a blog format, will be described. FIG. 2 is a flow chart illustrating an example of a blog printing process routine. The routine is performed by the CPU 31 executing the add-on 36 when a blog print button on a browser screen, which is activated using the web browser 35, is pressed. An example of a browser screen 50 is shown in FIG. 3. As shown in the diagram, in the browser screen 50, a normal print/preview button 52 for previewing and printing a web page which is currently being display and a blog print button 53 for performing blog printing are arranged in an upper portion of a tool bar 51, and a main window 54 for displaying the web page is arranged below the tool bar 51. In addition, the web page with the URL specified by a user is displayed in the main window 54. An appearance of the web page of a site created using a blog creation tool being displayed in the main window 54 is shown in FIG. 3. The main window 54 is divided into a first frame 55 where a log and comments are displayed, a second frame 56 where the name of the site of the blog is displayed, and a third frame 57 where a link for accessing another log is displayed. Here, a plurality of logs is created on the site, but in the first frame 55, not all logs are displayed, and for example, only the latest log is displayed. As a result, to print out a desired log by the user pressing the print/preview button 52 which performs normal printing, a complex operation is necessary where, first, the link in the third frame 57 or a link 58 which is arranged in the first frame 55 and which is for displaying the next item is pressed using the mouse 26, the desired log is searched for, and the print/preview button 52 is pressed when the desired log is displayed in the first frame 55.

When the blog printing process routine is executed, the CPU 31 determines whether or not the site of the web page currently displayed in the browser screen 50 is a site where blog printing is possible (step S100). The determination is performed using the site determination table 36a. An example of the site determination table 36a is shown in FIG. 4. As shown in the diagram, the site determination table 36a stores a site determination condition and a template classification number from A1 to An (where n is an integer) which express the classification of the template which is used by the web page of the site so that the site determination condition and the template classification number correspond. As shown in FIG. 4, the site determination condition is a condition of, for example, whether or not there is a predetermined object in JavaScript (registered trademark of Sun Microsystems Inc.) loaded on the web browser 35, whether or not a predetermined character string is included in the domain name or variables of JavaScript, whether or not a predetermined character string is included in the URL of the web page currently displayed in the browser screen 50, whether or not a predetermined tag is included in the document data which configures the web page currently displayed in the browser screen 50, or the like. In step S100, a process is performed where necessary data is acquired from the data which configures the web page currently displayed in the browser screen 50 and whether or not each of the site determination conditions of the site determination table 36a are satisfied is examined in order from the determination conditions corresponding to a template classification number A1. Then, in a case where any of the determination conditions are satisfied, the template classification number which corresponds to the determination conditions is stored in the RAM 32 and the site is determined to be a site where blog printing is possible. On the other hand, in a case where none of the site determination conditions of the site determination table 36a is satisfied, the site is determined to be a site where blog printing is not possible and the routine ends. Here, at this time, a message which expresses that blog printing is not possible may be displayed in the liquid crystal display 22.

When it is determined that the site is a site where blog printing is possible in step S100, the CPU 31 acquires document data which configures the site via the Internet 10 (step S110). In step S110, not only is the document data of the web page currently displayed in the browser screen 50 acquired, but also the URL written in the acquired document data is traced and document data of the web pages in the same site is sequentially acquired. Due to this, document data which includes all of the logs on the site is acquired. An example of the document data of the web pages shown in FIG. 3 is shown in FIGS. 5 and 6. Here, FIGS. 5 and 6 is one continuous string of document data. In addition, FIGS. 5 and 6 are shown so as to exclude the portions which are not necessary to describe the invention.

Next, the CPU 31 analyses the document data acquired in step S110 and additional information of the logs is acquired and stored in the RAM 32 (step S120). Here, in the embodiment, as the additional information of the logs, there is time and date information which expresses the data and time of a log, title information which expresses the title of a log, category information which expresses the category of a log, and the number of comments in the log. Here, the time and date information is automatically added when a log is created, the title information and the category information are added by the user who creates the log when the log is created, and the number of comments is automatically counted when another user writes a comment with regard to a log.

In the analysis of the document data, the analysis table 36*b* is used. An example of the analysis table 36*b* is shown in FIG. 7. The analysis table 36*b* stores the same template classification number as the site determination table 36*a* described above and analysis definition information for acquiring a log, the body of the log, the additional information and the comments so that the template classification number and the analysis definition information correspond. Here, in FIG. 7, only the analysis definition information which corresponds to the template classification number A1 is shown, but in practice, the respective pieces of analysis definition information correspond to the template classification numbers A1 to An. In step S120, the analysis of the document data is performed using the analysis definition information, which corresponds to the template classification numbers stored in the RAM 32 in step S100, out of the analysis definition information. Here, in order to perform blog printing, it is necessary that the document data (data written in HTML in the embodiment) which configures the web pages of the site which is currently displayed in the browser 50 is analyzed and the logs are specified, but it is often the case that the document data is, for example, created in accordance with a template which differs for each company which provides a blog creation tool to users. The template classification number in the embodiment corresponds to the types of the templates and it is possible for appropriate analysis to be performed by using the analysis definition information which corresponds to the template classification number stored in step S100.

Here, an appearance of the document data shown in FIGS. 5 and 6 being analyzed and the additional information of the log being acquired will be described. For example, when the site determination condition which corresponds to the template classification number A1 in step S110 is satisfied, the template classification number A1 is stored in the RAM 32. In this case, in step S120, the CPU 31 references the analysis definition information which corresponds to the template classification number A1 out of the analysis table 36*b* and performs the acquisition of the additional information. As shown in FIG. 7, when the analysis definition information which corresponds to the template classification number A1 is referenced, it is understood that the log is positioned in a tag <div class="blog"> (region 60 in FIGS. 5A and 5B) and the body of the log is positioned in a tag <div class="blogbody"> (region 61 in FIGS. 5A and 5B) in the tag <div class="blog">. In the same manner, it is understood that the time and date information, the title information, the category information, and the number of comments are positioned in regions 62 to 65 in FIGS. 5A and 5B and the comments are positioned in regions 66 and 67 in FIG. 6. Therefore, the CPU 31 acquires the character string of "Aug. 23, 2007" in the region 62 as the time and date information, acquires the character string of "Oirase, Akita" in the region 63 as the title information, acquires the character string of "diary" in the region 64 as the category information, and acquires the numerical value 2 in the region 65 as the number of comments. In this manner, when the additional information with regard to the log is acquired, the acquired time and date information, title information, category information, number of comments, and URL of the document file of the log are stored as the additional information in the RAM 32 to correspond with a log number. Here, the process of step S120 is performed in the same manner with regard to each of the logs in all of the document data acquired in step S120. Due to this, the additional information table, where time and date information, title information, category information, number of comments, and URL correspond to the log numbers for each of the logs, is stored in the RAM 32. An example of an additional information table 32*a* is shown in FIG. 8. Here, in the embodiment, the log number is set in a manner such as values B1, B2, . . . Bm (where m is an integer) in the order in which the additional information is acquired.

When the acquisition of the additional information of the logs is performed using step S120, out of the additional information table 32*a* which is stored in the RAM 32, the category information is listed and displayed in the liquid crystal display 22 as a category selection screen 70 by the CPU 31 (step S130). An example of the category selection screen 70 displayed in step S130 is shown in FIG. 9. As shown in the diagram, the category selection screen 70 is provided with a category display portion 71 which lists and displays the category information. The CPU 31 lists and displays the category information included in the additional information table 32*a* stored in step S120 in the category display portion 71. For example, if there are five types of the category information of "diary", "travel", "movie", "fashion", and "children's event" stored in step S120, the category information is listed and displayed in the category display portion 71. Here, the CPU 31 arranges the category information in order from where the number of logs which belong to each item of the category information is the largest and displays the category information in the category display portion 71. It is possible to determine the number of logs which belong to each item of the category information by referencing the additional information table 32*a*. For example, if the number of logs which corresponds to the category information "diary" is the largest out of the logs with log numbers B1 to Bm, "diary" is arranged at the top in the category display portion 71. In addition, a check box 72 where it is possible to specify whether or not to print with regard to each item of the category information is displayed in the category display portion 71.

When the category selection screen 70 is displayed, after the user has operated the keyboard 24 or the mouse 26 and at least one of the check boxes 72 of the categories of the logs where printing is desired is in a checked state, the CPU 31 waits for a "next" button 73 to be pressed (step S140). Then, when the "next" button 73 is pressed, the category information where the check box 72 is in a checked state is set as the extraction condition, is input, and stored in the RAM 32 (step S150). Due to this, the category of the logs to be printed is set.

Figures 10A, 10B:
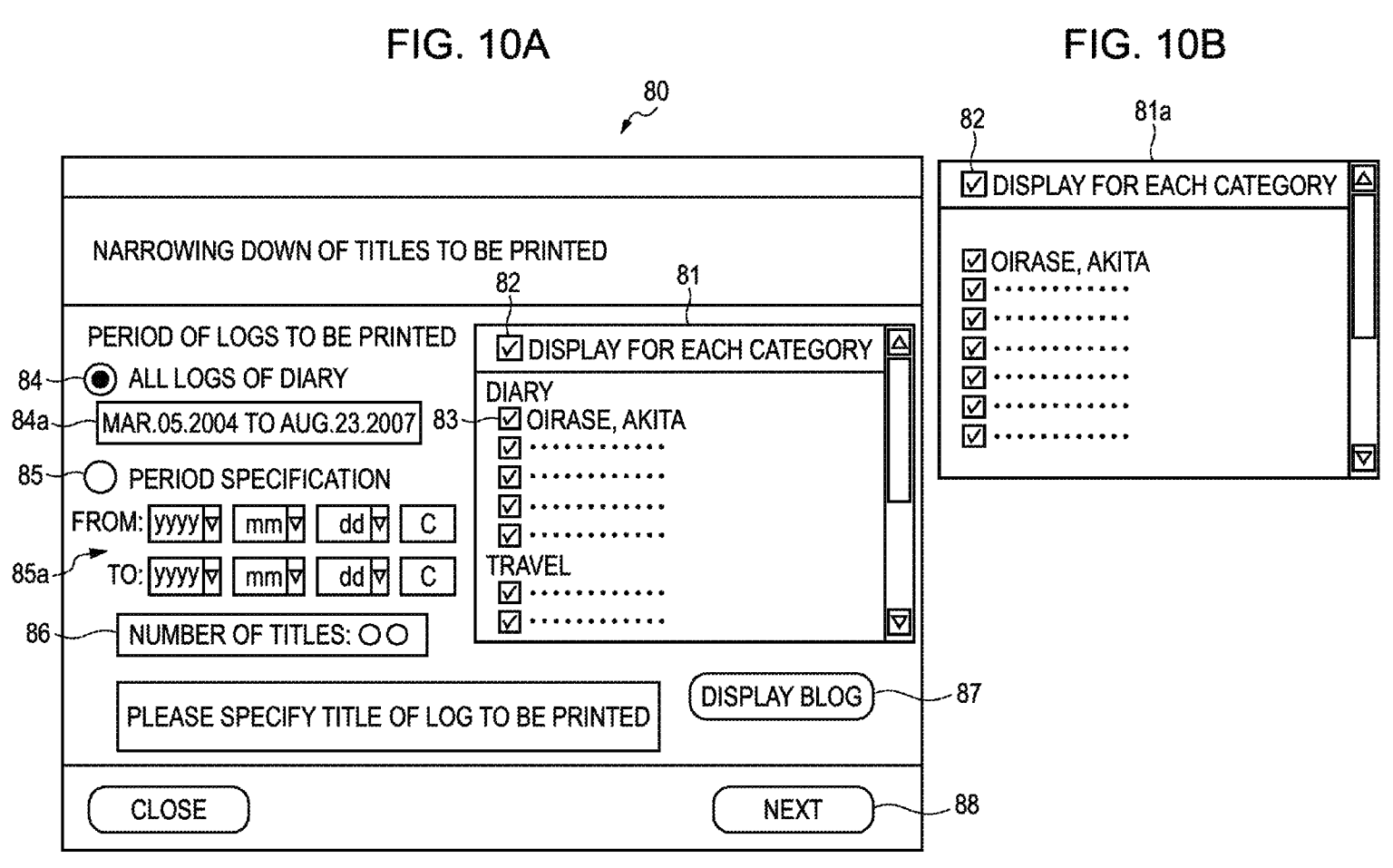

Next, the title information of the logs which belong to the category set in step S150 are listed and displayed in the liquid crystal display 22 as a title selection screen 80 by the CPU 31 (step S160). An example of the title selection screen 80 displayed in step S160 is shown in FIG. 10A. As shown in the diagram, the title selection screen 80 is provided with a title display portion 81 which lists and displays the title information. The CPU 31 lists and displays the title information of the logs which correspond to the category information set in step S150 in a title display portion 81. For example, if the category information of "diary" and "travel" has been set in step S150, the title information, which corresponds to the category information of "diary" and "travel" out of the title information stored in the additional information table 32*a*, is listed and displayed. Here, the title display portion 81 is provided with a check box 82 for the user to instruct whether or not the titles are displayed for each category. When the check box 82 is checked, the CPU 31 displays the title information in the chronological order (for example, in order from the latest time and date) expressed by the time and date information for each category set in step S150. On the other hand, when the check box 82 is not checked, the CPU 31 displays the title information in the chronological order expressed by the time and date information without arranging for each category (refer to FIG. 10B). Here, since the title information and the time and date information correspond in the additional information table 32a, it is possible to arrange the title information in chronological order by referencing the time and date information. In addition, a check box 83, where it is possible to specify whether or not to print with regard to each title of the logs, is displayed with each title displayed in the title display portion 81. Furthermore, a blog display button 87 is arranged under the title display portion 81. When the user presses the blog display button 87 where one out of the title information displayed in the title display section 81 is in a selected state, the CPU 31 accesses the URL which corresponds to the title information in the selected state and displays the web page which includes the log of the selected title on the liquid crystal display 22 using another window which is not shown in the diagram. Due to this, in a case where it is not clear where it is a log where printing is desired from only the title information, it is possible to also confirm the content of the log.

Furthermore, the title selection screen 80 is provided with a radio button 84 which is selected when all of the logs of the category set in step S150 are to be printed and a radio button 85 which is selected when only the logs in a specified period are to be printed. Under the radio button 84, a period display portion 84a is arranged which displays the time and date information of the oldest time series and the time and date information of the latest time series out of the logs of the category set in step S150. Under the radio button 85, a period specification portion 85a is arranged which is provided with a drop down box for specifying a period or a calendar button where specification of a period is possible by displaying a calendar when pressed. Under the period specification portion 85a, a title number display portion 86 is arranged which displays the number of the titles of the logs which are displayed in the title display portion 81. After the user specifies the category of the logs to be printed in step S140, it is possible to further narrow down the logs to be printed by selecting the radio button 85 in the title selection screen 80 and specifying the period using the period specification portion 85a. When the user operates the keyboard 24 or the mouse 26 and changes the period in the period specification portion 85a, the CPU 31 displays only the title information of the logs where the time and date information is within the specified period in the title display portion 81. In addition, in accordance with this, the number of titles displayed in the title number display portion 86 is changed.

When the title selection screen 80 is displayed, after the user specifies the period of the logs to be printed as described above and only the check boxes 83 which corresponds to the titles of the logs where printing is desired are in a checked state, the CPU 31 waits for a "next" button 87 to be pressed (step S170). Then, when the "next" button 87 is pressed, the CPU 31 inputs the title information where the check boxes 83 are in a checked state as the extraction condition. Then, the log numbers which correspond to the input title information are stored in the RAM 32 as the log numbers of the logs which match the extraction condition. Due to this, the logs which are the printing targets are set (step S180).

Next, the CPU 31 displays a print option setting screen 90 on the liquid crystal display 22 (step S190). An example of the print option setting screen 90 is shown in FIG. 11. The print option setting screen 90 is provided with a radio button 91 which is for specifying whether the order for printing the logs is in an ascending order or a descending order, a radio button 92 which is for specifying whether or not the comments in the log are also to be printed, a radio button 93 which is for specifying whether or not a cover, which is used in a case where the log to be printed is to be compiled as a booklet, is printed, and a "next" button 94. When the print option setting screen is displayed, the radio buttons 91 to 93 are selected by the user operating the keyboard 24 or the mouse 26 and the pressing of the "next" button is waited for (step S200), and when the "next" button is pressed, the setting of the specified print options are input and stored in the RAM 32 by the CPU 31 (step S210).

Next, the CPU 31 displays a layout setting screen which is not shown in the diagrams in the liquid crystal display 22 (step S220). The layout setting screen is, for example, for performing specification of the printing layout such as specification of the size of the paper sheets for printing, specification of whether or not a guide line of punch holes for binding the paper sheets after printing is to be printed and specification of the number of holes, and specification of whether or not a center guide line which is used when opening punch holes is to be printed. When the layout setting screen is displayed, the printing layout is specified by the user operating the keyboard 24 or the mouse 26 and the pressing of a "next" button which is not shown in the diagrams is waited for (step S230), and when the "next" button is pressed, the setting of the specified printing layout are input and stored in the RAM 32 by the CPU 31 (step S240).

In this manner, when each type of setting is performed in steps S150, S180, S210, and S240, the CPU 31 displays a printing confirmation screen (which is not shown in the diagrams) which displays the setting content stored in the RAM 32 and makes the user perform confirmation (step S250) and waits until the user presses a printing start button (which is not shown in the diagrams) which is arranged in the printing confirmation screen (step S260). When the printing start button is pressed, the CPU 31 creates log printing data and cover printing data based on the setting content stored in the RAM 32 (step S270).

Here, the creation of the log printing data will be described. First, the CPU 31 reads out the URL, which corresponds to the log number which is the printing target stored in the RAM 32 in step S180, from the additional information table 32a and acquires the document file of the URL via the Internet 10. Next, only a portion which is equivalent to a log is extracted from the acquired document file by referencing the analysis definition information. For example, in a case where the log shown in FIGS. 5A and 5B is the printing target, only the portion of the region 60 is extracted. Then, log printing data is created by the extracted log being embedded in the log printing template 36c. An example of the log printing template 36c is shown in FIG. 12 and an example of the log printing data acquired by embedding the portion of the region 60 in FIGS. 5A and 5B is shown in FIGS. 13A and 13B. As shown in the diagrams, the log printing template 36c is document data written using HTML. The log printing template 36c is provided with a replacement tag 68 for embedding the log, and other than that, is configured by the minimum amount of document data necessary for the HTML description such as headers. By the replacement tag 68 being replaced by the extracted log, the log printing data, where the log is embedded as shown in FIGS. 13A and 13B, is created. In a case where the comments are also specified to be printed in step S210, the CPU 31 embeds the log and the comments instead of the replacement tag 68 in FIG. 12. For example, in a case where the comments in the log of FIGS. 5A and 5B are also to be printed, the log printing data, where the region 60 of FIGS. 5A and 5B and the regions 66 and 67 of FIG. 6 are embedded instead of the replacement tag 68, is created. Here, in a case where a plurality of logs are specified as the printing target, the logs are extracted from the document file in accordance with the printing order of the logs specified in step S210 and the log printing data is created. Here, in a case where the plurality of logs are specified as the printing target, instead of the replacement tag 68, there may be log printing data where the plurality of logs are continuously embedded in the log printing template 36*c* or a plurality of log printing data where one log is embedded may be created.

Next, the creation of cover printing data will be described. The cover printing data is created when the printing of the cover is specified in step S210. In the embodiment, the printing cover data is stored in advance in the add-on 36 and the cover printing data is used as is.

Figure 14:
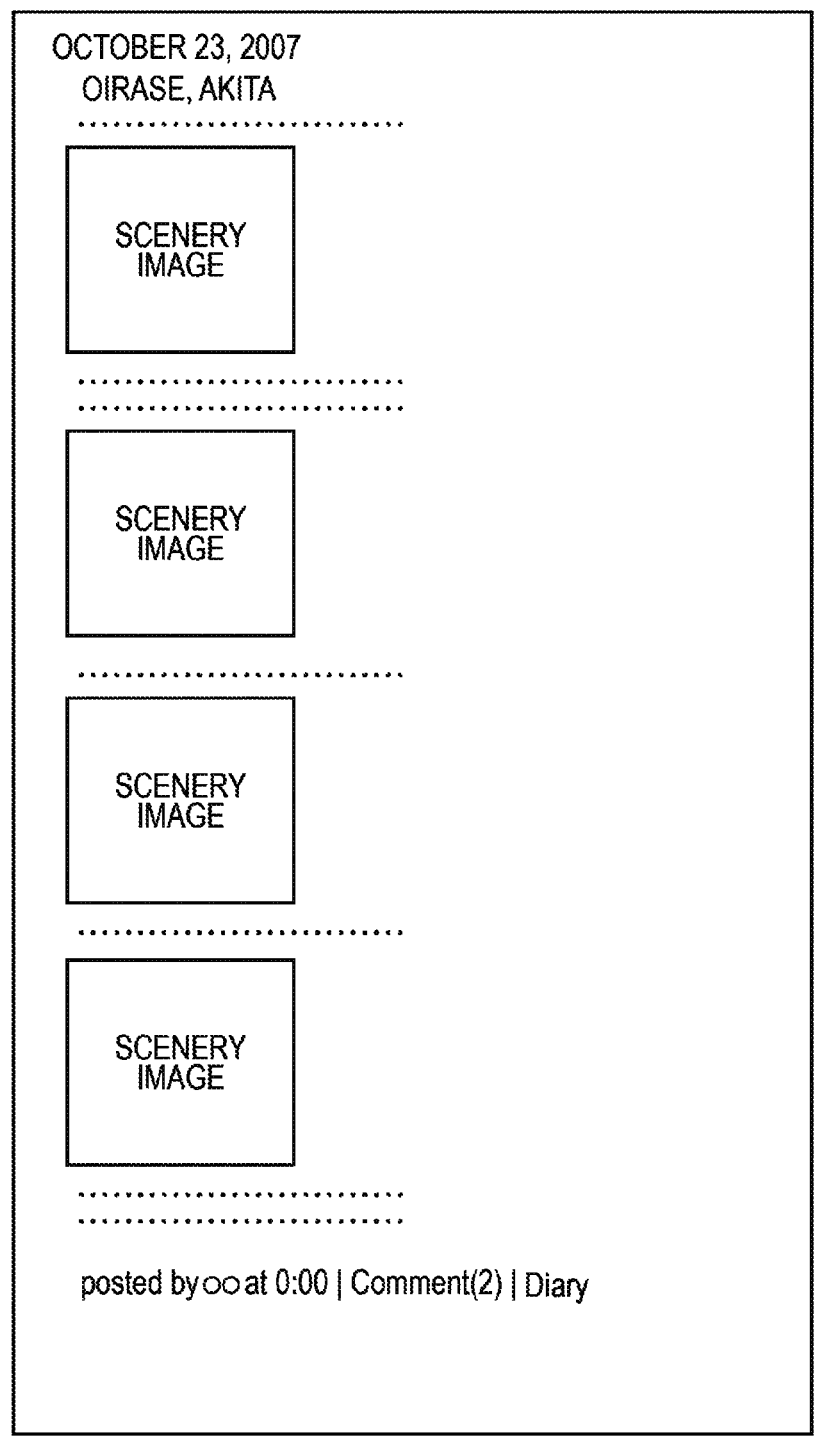
FIG. 14 is an explanatory diagram illustrating an example of a result of printing out log printing data.

In this manner, when the log printing data and the cover printing data are created, the CPU 31 set the printing data by combining the created log printing data and the cover printing data with the print layout setting information stored in the RAM 32 in step S240, sends the printing data to the printer 40 (step S280), and ends the routine. The printer 40 which receives the printing data prints the log desired by the user and the cover by performing printing based on the printing data. An example of the result of printing of the log printing data of FIGS. 13A and 13B is shown in FIG. 14.

Here, the corresponding relationships of the constituent elements of the embodiment and the constituent elements of the invention will be made clear. The CPU 31 which performs the process of step S110 in the blog printing process routine in the embodiment is equivalent to the document data acquisition unit of the invention, the HDD 33 which stores the log printing template 36*c* is equivalent to the template storing unit, the CPU 31, the keyboard 24, and the mouse 26 which perform the processes of steps S140 to S150 and S170 to S180 in the blog printing process routine are equivalent to the extraction condition input unit, the CPU 31 which performs the process of step S270 in the blog printing process routine is equivalent to the log extraction unit and the printing data creating unit, the CPU 31 which performs the process of step S120 in the blog printing process routine is equivalent to the additional information acquisition unit, the CPU 31, the keyboard 24, and the mouse 26 which perform the processes of steps S130 and S160 in the blog printing process routine are equivalent to the additional information output unit, and the CPU 31, the keyboard 24, and the mouse 26 which perform the processes of checking or removing the check of the check box 82 in step S160 in the blog printing process routine are equivalent to the instruction input unit. Here, in the embodiment, an example of an information processing method and a program of the invention have also been made clear using the description of the operation of the information processing device 20.

In the information processing device 20 in the embodiment described in detail above, the document data, which is written in a blog format which includes a plurality of logs using HTML, is acquired via the Internet 10 and an extraction condition such as specification of the category information or specification of the title information is input based on an operation by the user. Then, the acquired document data is analyzed, a log which matches the input extraction condition is extracted out of the plurality of logs included in the document data, and log printing data is created for printing the log by embedding the extracted log into the log printing template 36*c* written using HTML. That is, when the extraction condition is input for extracting a log which the user desires to print out, log printing data of the log which matches the extraction condition, that is, a log which a user desires to print out, is created. Due to this, it is possible to create log printing data for printing out the log desired by the user from a plurality of logs without a complicated operation.

In addition, each log in the plurality of logs has additional information and a condition associated with at least specification of the additional information is input as the extraction condition in steps S150 and S180 in the blog printing process routine. As a result, by the user specifying the additional information, log printing data for printing the log, which has the additional information specified by the user, is able to be acquired.

Furthermore, the document data which is acquired in step S110 of the blog printing process routine is analyzed, the additional information of the plurality of logs included in the document data is acquired, and the additional information which is acquired in steps S130 and S160 is listed and output to the user by being displayed on the liquid crystal display 22. Then, specification of at least one of the items of the output additional information is input based on an operation by the user. Due to this, since the additional information in the log is output to the user in advance, it is easy for the user to input the extraction condition.

Furthermore, in addition, in step S270 of the blog printing process routine, the log printing data for printing the log is created by embedding the extracted log into the log printing template 36*c* and the cover printing data for printing the cover of the log is created. Due to this, since not only the log printing data of the desired log but also the cover printing data is created, it is possible for the user to easily create a booklet where the desired log is compiled by performing printing based on the log printing data and the cover printing data.

Here, the invention is not limited in any way by the embodiment and various formats are possible within the technical scope of the invention.

For example, in the embodiment described above, in the step S160 in the blog printing process routine, the title information is displayed in chronological order in the title display portion 81 but may be displayed in another order. For example, the number of comments which corresponds to the title information may be read out from the additional information table 32*a* and the title information may be arranged and displayed on the title display portion 81 in order of the number of comments.

In the embodiment described above, in the step S270 in the blog printing process routine, the log which is the printing target (the region 60 in FIGS. 5A and 5B) is embedded in the log printing template 36*c*, but for example, only the body of the log(the region 61 in FIGS. 5A and 5B) may be embedded. In addition, only the body of the log and the time and date information (the region 62 in FIGS. 5A and 5B and the tag thereof) may be embedded. In addition, it is possible that the user may specify whether or not to have the time and date information embedded.

In the embodiment described above, in the step S270 in the blog printing process routine, the cover printing data is stored in advance in the add-on 36 and the cover printing data is used as is, but a cover setting screen which is not shown in the diagrams may be displayed on the liquid crystal display 22 and the settings of the cover may be performed. For example, when the printing of the cover is specified in step S210, the cover setting screen may be displayed. The cover setting screen is for performing the specification of whether or not to print the cover used in a case where the log to be printed is to be compiled as a booklet or specification of the content which is written on the cover, and for example, there may be a screen for performing inputting of the title and the author of the booklet and comments, the specification of an image file in a case where an image which is desired to be printed on the cover, specification of background color, and the like. Then, when the user performs these specifications and presses a "next" button which is not shown in the diagrams, the CPU 31 may store the specified settings of the cover in the RAM 32. In this case, a cover printing template may be stored in advance in the add-on 36 and the CPU 31 may perform the creation of cover printing data in step S270 by embedding the setting content written on the cover stored in the RAM 32 in the cover printing template. The cover printing template may be, for example, a document file written in HTML and may set the embedding position of the title, author, comments, positioning of an image, or specification of the background color in advance.

In the embodiment described above, in the step S120 in the blog printing process routine, the additional information of the log is acquired and the additional information table 32a is created, but not only the additional information of the log but the entire log (or the body of the log) and the comments may also be acquired by referencing the analysis table 36b and may be stored for each log to correspond to the log number.

In the embodiment described above, due to the steps S130 to S150 in the blog printing process routine, the category information is input as the extraction condition, but without the process being performed, step S160 may be executed after step S120. In this case, a list of all of the title information stored in the additional information table 32a may be displayed in step S160.

In the embodiment described above, in the steps S130 and S160 in the blog printing process routine, a list of the category information or the title information are displayed, but this process may be not performed. For example, by the user operating the keyboard 24 or the mouse 26, the additional information such as the category information, the title information, and the time and date information of the log which is desired to be printed may be input and the log which matches the input additional information may be the printing target by specification from the additional information table 32a. In addition, by the user operating the keyboard 24 or the mouse 26, key words in the body of the log may be input and the log which includes the key words in the body of the log may be the printing target.

In the embodiment described above, the log is extracted from the document file written in HTML and printed, but any markup language may be used without being limited to HTML.

In the embodiment described above, the blog printing is an extension facility of the web browser 35, but the web browser 35 may initially provided with the function of the add-on 36.

What is claimed is:

1. An information process device comprising:
    a document data acquisition unit which acquires document data written in a blog format which includes a plurality of logs using a markup language via a computer network;
    a template storing unit which stores a log printing template written in the markup language;
    an extraction condition input unit which inputs a predetermined extraction condition based on an operation by a user;
    a log extraction unit which analyses the acquired document data and extracts a log which matches the input extraction condition out of a plurality of logs included in the document data; and
    a printing data creating unit which creates log printing data for printing the log by embedding the extracted log into the log printing template.

2. The information process device according to claim 1, wherein each log in the plurality of logs has additional information,
    the extraction condition input unit is a unit which inputs a condition associated with at least specification of the additional information as the extraction condition, and
    the additional information includes at least any of time and date information which expresses the data and time of the log, title information which expresses the title of the log, or category information which expresses the category which the log belongs to.

3. The information process device according to claim 2, further comprising:
    an additional information acquisition unit which analyses the acquired document data and acquires the additional information of the plurality of logs included in the document data; and
    an additional information output unit which outputs the acquired additional information to the user as a list,
    wherein the extraction condition input unit is a unit which inputs specification of at least one of the items of the output additional information based on an operation by the user.

4. The information process device according to claim 3, wherein the additional information includes at least the category information,
    the additional information acquisition unit is a unit which acquires the category information as the additional information,
    the additional information output unit is a unit which arranges and outputs the category information in order of the number of logs which belong to each category when the acquired category information is listed and output to the user, and
    the extraction condition input unit is a unit which inputs specification of at least one of the items of the output category information based on an operation by the user as the specification of the additional information.

5. The information process device according to claim 3, wherein the plurality of logs have information on the number of comments which expresses the number of comments with regard to each of the logs,
    the additional information includes at least the title information,
    the additional information acquisition unit is a unit which analyses the acquired document data and acquires the title information and information on the number of comments which is expressed in the number of comments in the respective logs included in the document data so that the title information and information on the number of comments correspond,
    the additional information output unit is a unit which arranges and outputs the title information in order of the number of comments corresponding to the title information when the acquired title information is listed and output to the user, and
    the extraction condition input unit is a unit which inputs specification of at least one of the items of the output title information based on an operation by the user as the specification of the additional information.

6. The information process device according to claim 3, further comprising:
an instruction input unit which inputs an instruction from the user based on an operation by the user,
wherein the additional information includes at least the time and date information, the title information, and the category information,
the additional information acquisition unit is a unit which analyses the acquired document data and acquires the time and date information, the title information, and the category information in the respective logs included in the document data so that the time and date information, the title information, and the category information correspond to each other,
the additional information output unit is a unit which performs either of outputting of the title information in chronological order expressed by the time and date information for each category expressed by the category information or outputting of the title information in chronological order expressed by the time and date information irrespective of the category information, based on an instruction from the instruction input unit, when outputting the acquired title information arranged in chronological order based on the time and date information which corresponds to the title information, and the extraction condition input unit is a unit which inputs specification of at least one of the items of the output title information based on an operation by the user as the specification of the additional information.

7. The information process device according to claim 1, wherein the printing data creating unit is a unit which creates the log printing data for printing the log by embedding the extracted log into the log printing template and which creates cover printing data for printing the cover of the log.

8. An information process method comprising:
acquiring document data written in a blog format which includes a plurality of logs using a markup language via a computer network;
inputting a predetermined extraction condition based on an operation by a user;
analyzing the acquired document data and extracting a log which matches the input extraction condition out of a plurality of logs included in the document data; and
creating log printing data for printing the log by embedding the extracted log into the log printing template written in the markup language.

9. A non-transitory recording medium which stores a program which makes a computer function as the information processing device according to claim 1.

* * * * *